United States Patent
Kieffaber

[15] 3,688,892
[45] Sept. 5, 1972

[54] DOUGH CONVEYOR

[72] Inventor: Clarence A. Kieffaber, Overland Park, Kans.

[73] Assignee: Marion Corporation

[22] Filed: Sept. 24, 1970

[21] Appl. No.: 75,169

[52] U.S. Cl..................................198/84, 198/192
[51] Int. Cl.............................................B65g 37/00
[58] Field of Search.........198/84, 102, 103, 191, 192

[56] References Cited

UNITED STATES PATENTS

| | | | |
|---|---|---|---|
| 977,987 | 12/1910 | Willson, Jr.............. | 198/192 |
| 2,007,910 | 7/1935 | Stephens................ | 198/192 X |
| 1,457,352 | 6/1923 | Dreher.................... | 198/84 X |
| 2,869,710 | 1/1959 | Stewart.................... | 198/192 |
| 1,321,784 | 11/1919 | Bird......................... | 198/84 X |
| 203,825 | 5/1878 | Healey..................... | 198/192 |

FOREIGN PATENTS OR APPLICATIONS

| | | | |
|---|---|---|---|
| 819,142 | 8/1959 | Great Britain............. | 198/192 |

*Primary Examiner*—Evon C. Blunk
*Assistant Examiner*—H. S. Lane
*Attorney*—Alfred R. Fuchs

[57] ABSTRACT

A dough conveyor used as a fermentation conveyor. Dough is fed onto it from mixing apparatus by a conveyor operating at higher speed than the fermentation conveyor. The fermentation conveyor has an upper and a lower section moving in opposite directions. Each section has an upper run which has a driven roller at one end and a take-up roller at the other end. The major portion of the upper run of each conveyor has horizontal rollers supporting the middle portion of a neoprene belt and diverging inclined rollers supporting the side portions of the belt to form a trough-like portion. The inclined rollers are mounted on brackets made of flat bar stock and have lower horizontal portions, vertical portions, and parallel upwardly inclined portions at the ends of the horizontally and vertically extending portions between which the inclined rollers are mounted. The rollers are mounted on bars that carry anti-friction bearings pressed into the ends of hollow body portions of the rollers and bolts extend endwise into the ends of each bar to hold them from endwise movement relative to their mountings.

8 Claims, 6 Drawing Figures

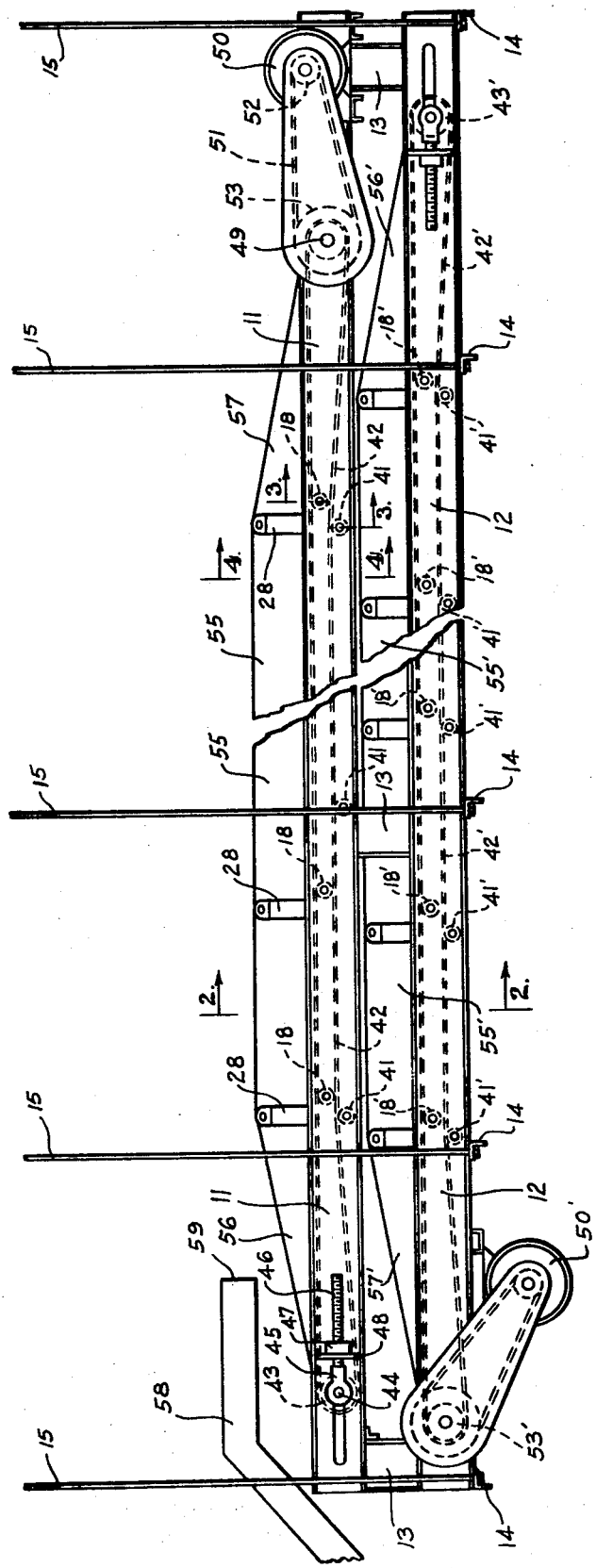
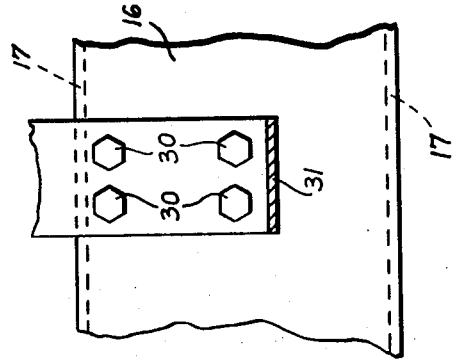
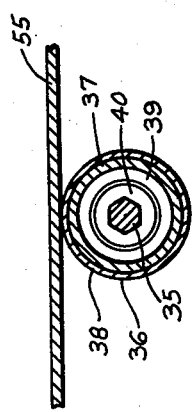
Fig. 1.
Fig. 5.
Fig. 6.
INVENTOR
CLARENCE A. KIEFFABER
BY
Alfred R. Fuchs
ATTORNEY INVENTOR
CLARENCE A. KIEFFABER
BY Alfred R. Fuchs
ATTORNEY

DOUGH CONVEYOR

It is the purpose of my invention to provide a Dough Conveyor that is particularly adapted for use as a fermentation conveyor, that is of such structure that it is sanitary and compact, so that it can be enclosed within a housing within which the temperature and humidity may be controlled for fermenting the dough, should this be desired.

My conveyor, when used as a fermentation conveyor, is supplied with a dough mixture that has been mixed but not developed, the dough being fed in a continuous stream from the mixing means to a conveyor that operates at a more rapid rate than the conveyor forming the subject matter of this invention, so that the dough will tend to pile up on the fermentation conveyor as it is fed thereto and carried away from the point of feeding at a slower rate than that at which it is deposited thereon.

In order to provide a dough conveyor that will be simple in construction and yet be adapted to form a trough-like belt member that will prevent any escape of the dough therefrom as it travels ravels along with the upper run of the same, rollers on which said belt is mounted are provided which comprise longer rollers that extend so as to rotate about horizontal axes between a pair of longitudinal frame members and shorter rollers that rotate about inclined axes that diverge upwardly from a horizontal axis, mounted on brackets that are detachably secured to longitudinal frame members, said brackets being closely adjacent the rollers that rotate about the horizontal axes in order to provide for the support of the conveyor belt in a manner to produce the trough-like form thereof.

In order to avoid the collection of flour or other foreign matter on the brackets, the same are made up of flat bar stock so as to avoid any corners or undesirable recesses in which flour or other foreign matter might collect.

The brackets are preferably independently detachably mounted on the web portion of channel members that form the longitudinal frame members. The brackets are provided with vertically extending portions that are attached, so as to be held against any swinging movement on said frame members, and with horizontally extending portions located at a slightly lower level than the horizontal axes of the longer rollers, there being inwardly and upwardly inclined portions at the ends of the vertically and horizontally extending portions of the brackets upon which the inclined rollers are mounted.

It is a further purpose of my invention to provide means for detachably mounting the conveyor rollers on the framework and on the bracket members, comprising bars that extend through hollow tubular body portions of the rollers and a short distance beyond anti-friction bearings that are pressed into the ends of said hollow body portions. Said bars are mounted in openings in the frame members, or the inclined end portions of the brackets, as the case may be, and held against endwise movement relative to said frame members or brackets by headed screw-threaded fastening elements that are screwthreaded into the ends of the bars upon which said rollers are mounted.

A further purpose of my invention is to provide a flexible and extensible belt for said conveyor which is made of rubber-like material, such as neoprene, which will conform to the rollers over which it is traveling so that there will be portions of the conveyor belt that are of a troughlike cross section and portions thereof that approach a flat transverse section.

It is a further purpose of my invention to provide a conveyor of the above mentioned character that has portions onto which the dough is fed from the feeding conveyor and from an upper conveyor section to a lower conveyor section operating in the opposite direction to the upper section that approach flatness.

Other objects and advantages of my invention will appear as the description of the drawings proceeds. I desire to have it understood, however, that I do not intend to limit myself to the particular details shown or described except as defined in the claims.

In the drawings:

FIG. 1 is a side elevation of my improved conveyor, the mid-portion thereof being broken away.

FIG. 5 is a detail fragmentary sectional view taken on the line 5—5 of FIG. 4, and FIG. 6 is a detail fragmentary inside elevational view of one of the frame members showing a portion of a bracket attached thereto, taken on the line 6—6 of FIG. 4.

Figure 2:
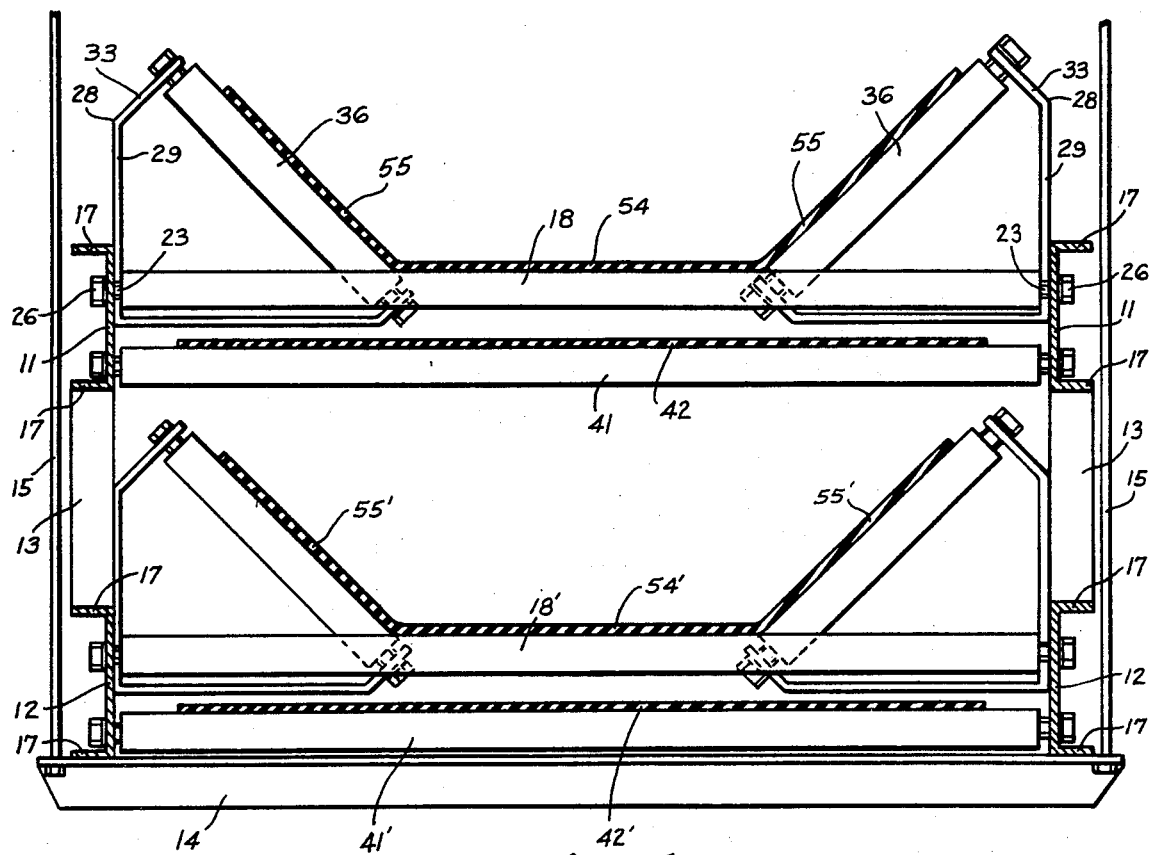
FIG. 2 is a vertical section thereof taken on the line 2—2 of FIG. 1 on an enlarged scale.

Referring in detail to the drawings, my improved conveyor is provided with a frame having upper and lower longitudinally extending frame members 11 and 12 which are secured in spaced relation to each other by vertical frame members 13, and said framework is supported by bottom transverse frame members 14, the same being suspended from a suitable support above the framework (not shown) by means of rods 15. While the conveyor is preferably suspended from above it is obvious that it can be mounted on a support below the same by suitably supporting the transverse frame members 14 on such a support.

The longitudinally extending frame members 11 and 12 are substantial duplicates and are each made up of a channel having a web portion 16 and upper and lower flanges 17. Each of the frame members 11 and 12 has a belt conveyor associated therewith, the construction of each of said conveyors being substantially the same. The upper run of each of said conveyor belts is provided with supporting means comprising rollers 18 which are mounted to rotate about horizontal axes between the opposed frame members 11. Each of said rollers 18 extends substantially the entire distance between the pair of longitudinal frame members 11 and is provided with a tubular body portion 19 which has an epoxi coating 20 provided on the exterior thereof. Anti-friction bearings 21, shown as being ball bearings, are pressed into each end of the tubular body portion 20 of each of said rollers, said ball bearings each having an inner race 22, that is provided with a hexagonal opening therein through which the bar 23 hexagonal in cross section extends, said bar fitting said opening closely. The bar 23 is of such length that it extends into but not through an opening 24 in each of the web portions 16 of the frame members 11, and is provided with an axial internally threaded opening 25 in each end thereof with which the threaded shank portion of a screw threaded headed element 26, in the form of a bolt, extends, a lock washer 27 being provided between the outer face of the web portion 16 and the head of the fastening element 26. By tightening up the headed screw threaded fastening elements 26 the bars 23 will be held detachably in fixed position with respect to the frame members 11, thus also locating the rollers 18 with respect to said frame members.

Brackets 28 are mounted at spaced intervals along frame members 11. Said brackets are made of flat bar stock and are bent so as to have vertically extending portions 29 which are secured to the inner sides of the frame members 11 closely adjacent but offset longitudinally of said frame members 11 from the rollers 18. In order to prevent any swinging of the brackets on the longitudinal frame members, and to provide for detachment of the brackets, should this be found desirable, said vertically extending portions 29 are secured flatly face to face to the web portions 16 of the frame members 11 by means of a plurality of fastening elements arranged so as to be located in different vertical and horizontal planes, such as the bolts 30 and nuts 30'. Extending from the vertically extending portion 29 at the lower end thereof is the horizontally extending portion 31 of each of said brackets. The remote end of the horizontally extending leg 31 of the bracket is bent upwardly at an oblique angle to provide the upwardly and inwardly extending end portion 32 thereon. The vertical leg 29 of said bracket is secured to the frame member 11 in such a position that the horizontal leg 31 thereof will be located below the axis of rotation of the adjacent horizontally extending roller 18. The vertically extending portion 29 of the bracket member is also provided at its end with an inwardly and upwardly extending portion 33 longer than the portion 32, which is bent to extend parallel to the portion 32.

The upwardly and inwardly obliquely extending portions 32 and 33 are provided with openings 34 into which extend bars 35 that are hexagonal in cross section and are of the same character as the bars 23 except that they are shorter, being of such a length that they do not extend entirely through the openings 34. Said bars 35 are secured to the angularly extending end portions 32 and 33 in the same manner as the bars 33 are secured to the frame members 11, by means of the headed fastening elements 26 and lock washers 27. The rollers 36, provided with hollow tubular body portions 37 similar to the body portions of the rollers 18 and a coating 38 similar to the coating provided for the rollers 18, have the bearings 39 pressed into the same, which bearings have hexagonal openings 40 for snugly receiving the bar 35. The rollers 36 are thus mounted to rotate about upwardly diverging inclined axes with the top surfaces at the lower ends thereof in substantially horizontal alignment with the top surface of the adjacent rollers 18.

Mounted at a lower level than the rollers 18 on the frame members 11, in substantially the same manner as the rollers 18, are the rollers 41 which are made in the same manner as the rollers 18 but are of smaller diameter, said rollers having tubular body portions 19' having a coating 20' thereon and having anti-friction bearings 21' provided with openings 22' to receive the hexagonal in cross section bars 23' which extend into openings 24' in said frame member 11 and are secured in position against endwise movement relative to the frame members 11 by suitable fastening elements screw threaded into the same comprising bolts 26' and a lock washer 27' provided between the head 26' of said bolt and the web portion 16 of the frame member 11.

A conveyor belt 42 extends over the rollers 41 and over a take-up roller 43 which is mounted on a suitable shaft 44, that is adjustable lengthwise of the frame members 11, bearing members 45 for said shaft being provided on one end of movable members that have screw threaded portions 46 and nuts 47 that engage with a transverse web portion 48 on each of the frame members 11, for holding the shaft 44 in adjusted position so as to put the proper amount of tension on the conveyor belt 42. Said conveyor belt extends from the take-up roller 43 to the driven roller 49 over the rollers 18 that rotate about horizontal axes and the rollers 36 that rotate about upwardly diverging inclined axes. Said conveyor belt extends around the driven roller 49 and back under the upper run thereof on the rollers 41. The roller 49 is driven by means of a motor 50, which may be provided with suitable speed reducing means, by a sprocket chain 51 operating over a sprocked 52 and a sprocket 53 mounted to rotate with the driven roller 49. The conveyor belt 42 is made of a flexible extensible material such as rubber or neoprene.

It will accordingly be evident that the upper conveyor section, having the frame members 11, has a conveyor belt 42 operating over the same that has a lower run, that is substantially flat, in engagement with rollers 41 and an upper run which, over the major portion thereof, has a longitudinally extending central portion 54 that is transversely horizontal or substantially flat, and upwardly and outwardly inclined portions 55 each side thereof, thus forming a trough-like member for the reception of material that is fed on to same, such as dough. The portion of the conveyor belt 42 that extends between the take-up roller 43 and the nearest pair of inclined rollers 36 thereof, has the side portions gradually inclined upwardly from the flat portion thereof extending around the take-up rollers to the trough-like portion thereof, as shown in FIG. 2, where said conveyor belt is in engagement with the rollers 18 and 36, thus providing a portion on each side of the longitudinally centrally located flat portion 54, that gradually approaches flatness toward the take-up roller 43, this portion being indicated by the numeral 56. A similar portion 57 that gradually approaches flatness as it reaches the portion thereof that extends around the driven roller 49, also exists at the opposite end of said conveyor section.

A feeding conveyor, indicated diagrammatically at 58, discharges at 59 above the portion of the upper run of the conveyor 42 between the take-up roller 43 and the pair of inclined rollers 36 nearest said take-up roller. Preferably the conveyor 58 operates in the same direction and at a considerably faster lineal speed than the conveyor belt 42, as it is desired to provide for an extended period of time for the dough to be carried along by my conveyor, particularly when it is used as a fermentation conveyor, the belt 42 operating comparatively slowly. As a result the dough discharged from the conveyor 58 will accumulate on the conveyor belt 42 as it is deposited thereon. The relative speed of the two conveyors can be adjusted to obtain any required accumulation of the dough on the conveyor belt 42.

Figures 3, 4:
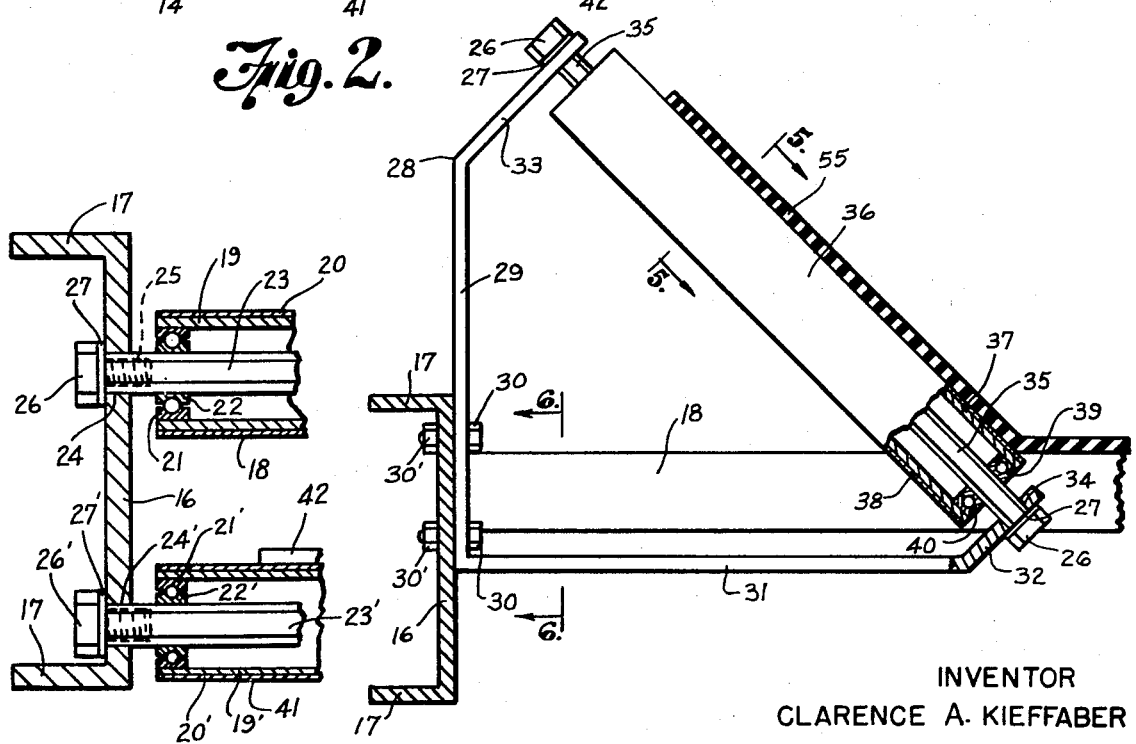
FIG. 3 is a fragmentary vertical sectional view showing one of the frame members and portions of the rollers associated therewith taken substantially on the line 3—3 of FIG. 1 on a still larger scale.
FIG. 4 is a view partly in elevation and partly in vertical section and partly broken away taken on the line 4—4 of FIG. 1 on an enlarged scale.

Mounted on the frame members 12 in a similar manner to the rollers 18 and 41, are the rollers 18' and 41', said rollers being of the same length as the rollers 18 and 41 and being mounted in the same manner as the rollers 18 and 41, which is shown more in detail in FIG. 3. Brackets 28 are provided on the frame members 12 and are the same in shape and mounted in the same manner on the frame members 12 as the brackets 28, above described, are mounted on the frame members 11, the conveyor belt 42' operating over said rollers in the same manner as above described in connection with the rollers 18 and 41. The brackets 28 are mounted on the frame members 12 closely adjacent the rollers 18' and are provided with rollers 36 for engagement of the belt 42' therewith in the same manner as the belt 42 engages with the said rollers 36 provided on the brackets 28, that are mounted on the upper frame members 11. Thus, the major portion of the conveyor belt 42' has an upper run that has a longitudinally centrally located portion 54' that is substantially flat and oppositely upwardly divergently inclined side portions 55'. Said lower conveyor section is substantially a duplicate of the upper conveyor section except for its direction of travel. Instead of traveling from left to right, as shown in FIG. 1, it travels from right to left, the take-up roller 43' corresponding to the take-up roller 43 previously described, being mounted on the right hand end of the lower conveyor section and the driven roller 53', corresponding to the driven roller 53 of the upper conveyor section, being on the left hand end of the said section, being driven by a separate motor 50' in a similar manner to the driven roller 53. If desired the two conveyor belts 42 and 42' can be driven at different speeds to either increase or decrease the cross sectional bulk of the dough on the conveyor belt 42' because of the independent drive of the two conveyor sections.

It is to be noted that the end portions 56' and 57' of the upper run of the lower conveyor belt 42 correspond to the portions 56 and 57 of the upper run of the upper conveyor belt 42 and that the dough will be discharged from the portion of the belt 42 extending over the driven roller 53 onto the portion of the lower conveyor belt 42' that is located between the take-up roller 43' and the nearest pair of brackets 28 thereto, thus being discharged onto a portion of the lower belt 42' that approaches flatness.

What I claim is:

1. A dough conveyor comprising a frame having a pair of longitudinally extending frame members, rollers mounted on said frame members to extend transversely between the same from one thereof to the other thereof and rotate about parallel horizontal axes, pairs of opposed flat faced brackets mounted on said longitudinal frame members in closely adjacent offset relation longitudinally of said frame to said rollers, rollers mounted on each pair of said brackets to rotate about inclined axes extending in upwardly diverging relation to said horizontal axes, a belt of flexible extensible material mounted on said rollers to extend longitudinally of said frame with the longitudinally central portion thereof engaging said first mentioned rollers and the portions on opposite sides of said longitudinally central portion engaging the rollers mounted to rotate about said inclined axes, and a driven roller mounted between said frame members to extend transversely between the same near one end thereof and rotating about a horizontal axis spaced longitudinally of said frame from said rollers rotating about said inclined axes, said belt extending around said driven roller in engagement therewith.

2. The dough conveyor claimed in claim 1 having a take-up roller mounted between said frame members to extend transversely between the same near the other end thereof and rotating about a horizontal axis apaced longitudinally of said frame from said rollers rotating about said inclined axes, said belt extending around said take-up roller in engagement therewith, and means for discharging a continuous stream of dough onto said belt between the portion thereof in engagement with said take-up roller and the portion thereof in engagement with the pair of rollers rotating about said inclined axes nearest said take-up roller, said means for discharging said continuous stream of dough onto said belt comprising a conveyor operating in the same direction and at much greater lineal speed than said belt.

3. The dough conveyor claimed in claim 1 in which said rollers have bearings mounted on inclined shafts, said shafts having axial internally threaded openings in the end portions thereof, said end portions extending into openings in said brackets and headed screw threaded fastening elements engaging said internally threaded portions to clamp the ends of said shafts to said brackets against axial movement of said shafts relative to said brackets.

4. The dough conveyor claimed in claim 1 in which said brackets have flat faced horizontally extending portions depressed below said horizontal axes, flat faced vertically extending portions secured to said longitudinally extending frame members and parallel flat faced inclined end portions mounting said rollers.

5. The dough conveyor claimed in claim 4 in which said longitudinal frame members have flat faced vertical web portions and a plurality of securing elements located to prevent swinging movements of said brackets about said longitudinally extending frame members detachably connect said vertically extending portions of said brackets face to face with said web portions of said frame members.

6. The dough conveyor claimed in claim 4 in which one of said inclined end portions of each of said brackets extends inwardly and upwardly from the vertically extending portion thereof and the other inclined end portion extends inwardly and upwardly from the horizontally extending portion thereof.

7. A dough conveyor comprising a frame having a pair of upper longitudinally extending frame members and a pair of lower longitudinally extending frame members, rollers mounted on each of said frame members to extend transversely between the same and rotate about parallel horizontal axes, pairs of opposed brackets mounted on each of said frame members in offset relation longitudinally of same frame member to said rollers mounted thereon, rollers mounted on each pair of said brackets to rotate about inclined axes extending in upwardly diverging relation to said horizontal axes, a belt of flexible extensible material mounted on said rollers on each of said frame members, to extend longitudinally of said frame with the longitudinally central portion thereof engaging said first mentioned rollers on said frame member and the portions on opposite sides of said longitudinally extending central portion engaging the rollers mounted on said frame members to rotate about said inclined axes, and a driven roller mounted between each pair of said frame members to extend transversely between the same near one end thereof and rotating about a horizontal axis spaced longitudinally of said frame from said rollers rotating about said inclined axes, said belts each extending around one of said driven rollers in engagement therewith, a take-up roller mounted between each pair of said frame members to extend transversely between the same near the other end thereof and rotating about a horizontal axis spaced longitudinally of said frame from said rollers rotating about said inclined axes, said belts each extending around one of said take-up rollers in engagement therewith, means for discharging a continuous stream of dough onto said belt between the portion thereof in engagement with said take-up roller mounted between said upper pair of frame members and the portion thereof in engagement with the pair of rollers rotating about said inclined axes nearest said take-up rollers, said last mentioned means comprising a conveyor operating at much greater lineal speed than said belts.

8. A dough conveyor comprising a frame having longitudinally extending frame members, rollers mounted on said frame members to extend transversely between the same and rotate about parallel horizontal axes, pairs of opposed brackets mounted on said frame members in offset relation longitudinally of said frame to said rollers, rollers mounted in upwardly diverging relation to said horizontal axes, a belt of flexible extensible material mounted on said rollers to extend longitudinally of said frame with the longitudinally central portion thereof engaging said first mentioned rollers, and the portions on opposite sides of said longitudinally central portion engaging the rollers mounted to rotate about said inclined axes, said brackets each comprising a flat bar bent to provide a horizontally extending lower portion, a vertically extending portion, a lower upwardly inclined end portion extending from said horizontally extending lower portion and an upper upwardly inclined end portion extending from said vertically extending portion in parallelism to said lower upwardly inclined portion, said rollers mounted to rotate about said inclined axes being each mounted between a pair of said upwardly inclined portions of said brackets.

* * * * *